(12) United States Patent
Griffiths et al.

(10) Patent No.: US 10,564,368 B2
(45) Date of Patent: Feb. 18, 2020

(54) OPTICAL FIBER CONNECTOR ASSEMBLY

(71) Applicant: Prysmian S.p.A., Milan (IT)

(72) Inventors: Ian Griffiths, Milan (IT); Matt Kerry, Milan (IT); Stephen Pike, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 16/109,969

(22) Filed: Aug. 23, 2018

(65) Prior Publication Data

US 2019/0033535 A1 Jan. 31, 2019

Related U.S. Application Data

(63) Continuation of application No. 15/501,660, filed as application No. PCT/EP2014/066920 on Aug. 6, 2014, now Pat. No. 10,146,018.

(51) Int. Cl.
*G02B 6/38* (2006.01)
*G02B 6/44* (2006.01)

(52) U.S. Cl.
CPC ......... *G02B 6/3887* (2013.01); *G02B 6/3869* (2013.01); *G02B 6/3874* (2013.01); *G02B 6/3894* (2013.01); *G02B 6/4477* (2013.01)

(58) Field of Classification Search
CPC .. G02B 6/3849; G02B 6/3851; G02B 6/3869; G02B 6/3874; G02B 6/3887
USPC .................................................... 385/53–87
See application file for complete search history.

(56) References Cited

U.S. PATENT DOCUMENTS

| 7,591,595 B2* | 9/2009 | Lu .......................... G02B 6/3816 385/60 |
| 2008/0175541 A1 | 7/2008 | Lu et al. |
| 2009/0162016 A1 | 6/2009 | Lu et al. |

FOREIGN PATENT DOCUMENTS

| CN | 101589320 A | 11/2009 |
| CN | 101893741 A | 11/2010 |
| CN | 102483495 A | 5/2012 |
| DE | 10 2009 019 112 | 11/2010 |
| WO | WO 2008/021351 | 2/2008 |

OTHER PUBLICATIONS

First Office Action issued from the State Intellectual Property Office of the People's Republic of China, in counterpart Chinese Patent Application No. 201480082040.3, dated May 3, 2018.

(Continued)

*Primary Examiner* — Michael P Mooney
(74) *Attorney, Agent, or Firm* — Finnegan, Henderson, Farabow, Garrett & Dunner, L.L.P.

(57) ABSTRACT

Optical fiber connector assembly for a fiber optic cable comprising an optical fiber having an end portion terminated with a ferrule and rod members (4). The optical fiber connector assembly comprises:
a ferrule holder (110) configured to hold the end portion of the optical fiber (10), the ferrule (30) and the rod members (4);
a connector (190) having an internal passageway for housing the ferrule holder (110);
a locking member (180) extending lengthwise and having an internal passageway for the end portion of the fiber optic cable (1). There is also disclosed a pre-connectorized fiber optic cable comprising a fiber optic cable and the optical fiber connector assembly mounted upon an end portion of the fiber optic cable.

18 Claims, 6 Drawing Sheets

(56) References Cited

OTHER PUBLICATIONS

International Search Report from the European Patent Office for International Application No. PCT/EP2014/066920, dated Sep. 17, 2014.
Written Opinion of the International Searching Authority from the European Patent Office for International Application No. PCT/EP2014/066920, dated Sep. 17, 2014.

* cited by examiner

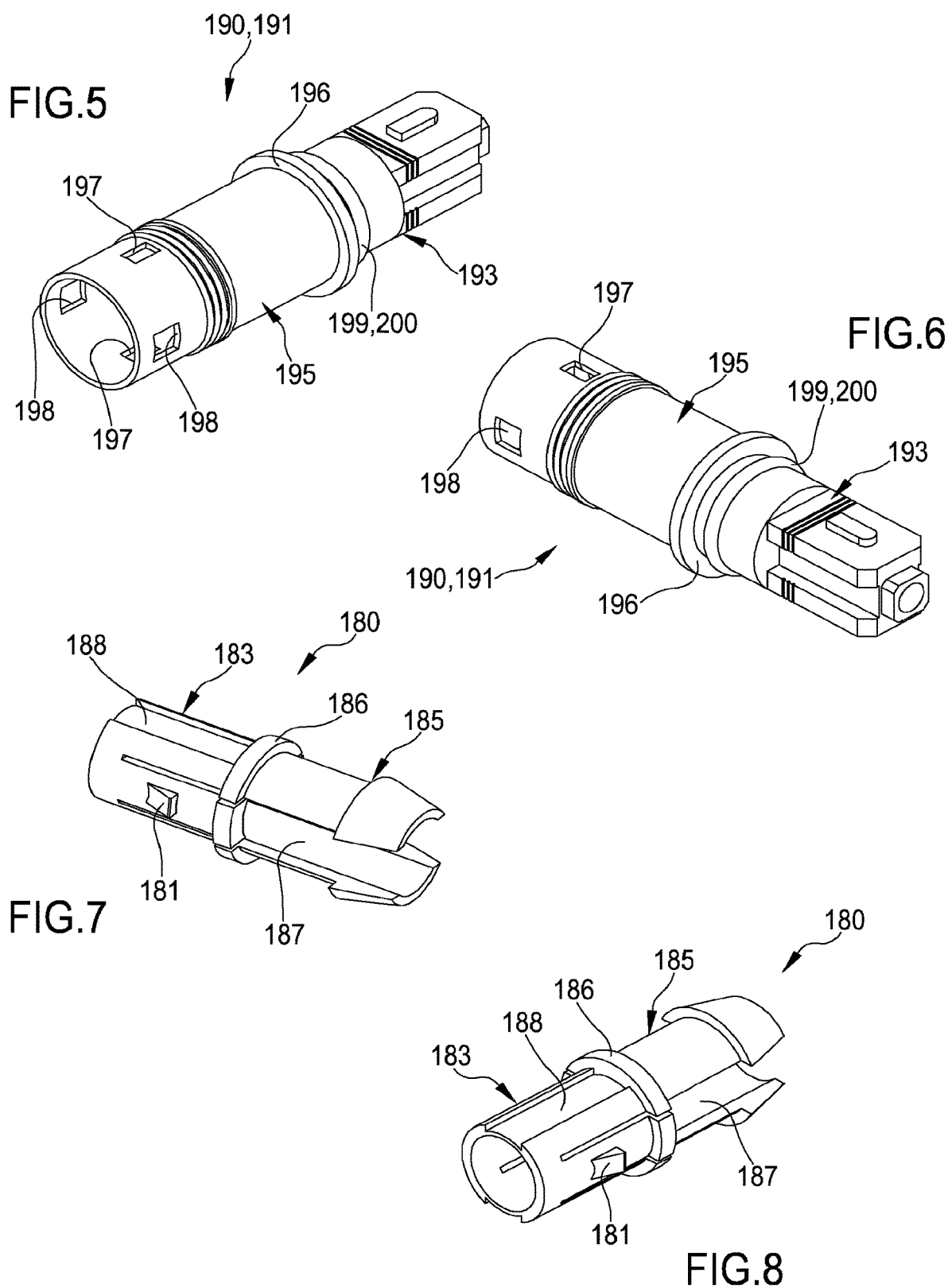

OPTICAL FIBER CONNECTOR ASSEMBLY

CROSS-REFERENCE TO RELATED APPLICATIONS

This application is a continuation of U.S. application Ser. No. 15/501,660, filed on Feb. 3, 2017, based on PCT/EP2014/066920, filed Aug. 6, 2014, the content of which is incorporated herein by reference.

BACKGROUND OF THE INVENTION

Field of the Invention

The present invention relates to an optical fiber connector assembly. The present invention also relates to a pre-connectorized fiber optic cable comprising said optical fiber connector assembly.

Description of the Related Art

The connection of an optical fiber to another optical fiber is generally carried out by means of an optical connector. Generally, an optical fiber connector is a mechanical component used to align and join together two optical fibers. The optical fibers may be part of a fiber optic cable or of a device, such as an optical or opto-electronic device. A pre-connectorized fiber optic cable is generally a fiber optic cable having an end portion pre-terminated with an optical connector.

EP 2 052 286 discloses a fiber optic connector assembly comprising a connector sub-assembly and a retention body, both disposed within a hollow plug housing. The retention body includes a first portion that is configured to engage and retain an optical cable comprising an optical fiber and one or more strength members, and a second portion that is configured to engage and retain the connector sub-assembly. The connector sub-assembly comprises an optical ferrule optically coupled to the optical fiber. The second portion of the retention body comprises a pair of opposed snap hooks that are configured to engage a corresponding pair of opposed recesses of the connector sub-assembly. The fiber optic connector assembly further comprises an end cap having an insertion end, configured to be inserted snugly into the back end of the hollow plug housing, and a tapering end configured to receive the optical cable.

It is clear from the above that the fiber optic connector assembly of EP 2 052 286 has mechanical couplings between the pieces. In particular, a first coupling is present between the connector sub-assembly and the retention body and a second coupling is present between the hollow plug housing and the end cap. These types of mechanical couplings, however, do not guarantee high mechanical strength of the whole assembly.

The Applicant faced the technical problem of providing an optical fiber connector assembly with an alternative and improved design, which enables to increase the mechanical strength of the whole optical fiber connector assembly and to avoid cable bending in the proximity of the ferrule.

SUMMARY OF THE INVENTION

The Applicant found that it is convenient to have an optical fiber connector assembly comprising a ferrule holder configured to house an optical fiber terminated with a ferrule and rod members; a connector having an internal passageway for accommodating the ferrule holder; and a locking member extending lengthwise and having an internal passageway for the end portion of the fiber optic cable, wherein each element among the ferrule holder, the body and the locking member is mechanically coupled to both the other two elements.

In a first aspect the present invention thus relates to an optical fiber connector assembly for a fiber optic cable comprising an optical fiber, having an end portion terminated with a ferrule, and rod members, the optical fiber connector assembly extending lengthwise along a longitudinal axis and comprising:
  a ferrule holder configured to hold the end portion of the optical fiber, the ferrule and the rod members;
  a connector having an internal passageway for housing the ferrule holder;
  a locking member extending lengthwise and having an internal passageway for the end portion of the fiber optic cable,
wherein the connector is configured to be mechanically coupled to the ferrule holder, and
wherein the locking member is configured to be mechanically coupled both to the ferrule holder and to the connector.

The above configuration, wherein each element of the ferrule holder, the body and the locking member is directly mechanically coupled to the other two elements (that is, without any intermediate mechanical coupling) advantageously enables to improve the mechanical strength of the optical fiber connector assembly as a whole and, in particular, both the tensile strength and the torsion strength. In addition, it enables to obtain a more compact optical fiber connector assembly. Furthermore, the ferrule holder configured to hold the optical fiber end portion, the ferrule and the rod members advantageously avoids cable bending in the proximity of the ferrule.

In a second aspect, the present invention relates to a pre-connectorized fiber optic cable comprising a fiber optic cable and a optical fiber connector assembly mounted upon an end portion of the fiber optic cable, the fiber optic cable comprising a cable jacket accommodating an optical fiber, having an end portion terminated with a ferrule, and rod members, the optical fiber connector assembly comprising:
  a ferrule holder holding the end portion of the optical fiber, the ferrule and the rod members;
  a connector accommodating the ferrule holder and configured to mate with a corresponding receptacle;
  a locking member extending lengthwise and having an internal passageway accommodating the end portion of the fiber optic cable,
wherein each element among the ferrule holder, the body and the locking member is mechanically coupled to both the other two elements.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description, the terms "distal", "proximal", "forward", "front", "back" in relation to an optical fiber connector assembly are used with reference to an end portion of a fiber optic cable upon which the optical fiber connector assembly is mounted. In particular, the terms "proximal" and "back" are used with reference to an element of the optical fiber connector assembly situated near to the end portion of the fiber optic cable, while the terms "distal", "front" and "forward" are used with reference to an element of the optical fiber connector assembly situated away from the end portion of the fiber optic cable.

The present invention in at least one of the aforementioned aspects can have at least one of the following preferred characteristics.

Preferably, the mechanical coupling between the connector and the ferrule holder is made by means of a mechanical coupling configured to prevent relative rotation about said longitudinal axis and relative axial movement along said longitudinal axis.

Preferably, the mechanical coupling between the locking member and the connector is made by means of a mechanical coupling configured to prevent relative rotation about said longitudinal axis and relative axial movement along said longitudinal axis.

In a preferred embodiment, said mechanical coupling is a snap coupling.

Preferably, the locking member is configured to be mechanically coupled to the ferrule holder by means of a mechanical coupling configured to prevent relative rotation about said longitudinal axis.

Preferably, the ferrule holder comprises a proximal portion comprising a seat for the end portion of the fiber optic cable.

Preferably, the ferrule holder comprises a distal portion comprising a sleeve portion configured to hold the end portion of the optical fiber, the ferrule and the rod members.

In a preferred embodiment, the proximal portion of the ferrule holder comprises two opposite arms forming said seat.

Preferably, the locking member comprises a distal portion configured to mate with said opposite arms so as to provide said mechanical coupling to the proximal portion of the ferrule holder.

Preferably, the distal portion of the locking member comprises two recesses extending lengthwise, configured to mate with said opposite arms of the ferrule holder.

In a preferred embodiment, the two opposite arms of the proximal portion of the ferrule holder comprise respective coupling members configured to engage corresponding coupling members in a proximal portion of the body, so as to provide said mechanical coupling between the proximal portion of the body and the proximal portion of the ferrule holder.

Preferably, the ferrule holder comprises a medial portion between the sleeve portion and the proximal portion.

Preferably, the two opposite arms forming said seat extend lengthwise and project backward from the medial portion of the ferrule holder.

Preferably, the medial portion of the ferrule holder provides an abutment surface for the front face of the end portion of the fiber optic cable.

Preferably, the medial portion of the ferrule holder comprises a hole in communication with an internal passageway of the sleeve portion for receiving the end portion of the optical fiber terminated with the ferrule.

Preferably, the sleeve portion of the ferrule holder comprises grooves on its lateral external surface, said grooves extending lengthwise between proximal and distal ends of the sleeve portion and being configured to house said rod members.

Preferably, the medial portion comprises holes in communication with said grooves for receiving said rod members.

Preferably, the optical fiber connector assembly comprises a first crimping element configured to be disposed about the ferrule holder to grip the rod members.

Preferably, the optical fiber connector assembly comprises a second crimping element adapted to crimp a proximal portion of the locking member about the end portion of the fiber optic cable.

Preferably, the proximal portion of the locking member has on its lateral surface at least one aperture and the second crimping element is adapted to crimp the locking member about the end portion of the fiber optic cable at said at least one aperture.

Preferably, the body of the connector has a distal portion configured to mate with a corresponding receptacle.

Preferably, the distal portion of the body of the connector is configured to house the sleeve portion of the ferrule holder.

Preferably, the distal portion of the body is in the shape of a standard plug housing.

Preferably, the distal portion of the body is devoid of lateral apertures.

Preferably, the proximal portion of the body of the connector is configured to house the proximal portion of the ferrule holder.

In a preferred embodiment, the body of the connector is monolithic (i.e. made of one piece).

In a preferred embodiment, the ferrule holder is monolithic (i.e. made of one piece).

Preferably, the sleeve portion of the ferrule holder comprises an internal passageway extending lengthwise for accommodating the end portion of the optical fiber terminated with the ferrule.

Preferably, the sleeve portion of the ferrule holder comprises a slot extending lengthwise between distal and proximal ends thereof such as to enable insertion of the end portion of the optical fiber within the internal passageway of the sleeve portion.

Preferably, the ferrule is associated with a spring, the sleeve portion of the ferrule holder defining an internal shoulder for the spring, proximate a distal end of the sleeve portion.

Preferably, the ferrule comprises a flange.

Preferably, the spring is disposed about the ferrule within the sleeve portion, between said internal shoulder of the sleeve portion and said flange of the ferrule.

Preferably, the flange of the ferrule has an outer diameter greater than the outer diameter of the spring so as to stop the travel of the spring in the lengthwise direction beyond the flange, towards a distal end of the ferrule.

Preferably, the at least one aperture on the lateral surface of the proximal portion of the locking member comprises two opposite apertures (for example, two diametrically opposite apertures extending lengthwise, preferably of rectangular shape).

Preferably, the optical fiber connector assembly further comprises a nut configured to be disposed about the body of the connector.

Preferably, the nut is configured to fix the optical fiber connector assembly to a corresponding receptacle.

Preferably, the body of the connector comprises a shoulder having an outer diameter greater than an inner diameter the nut such that the travel of the nut in the lengthwise direction towards the distal end of the body is limited, while allowing the nut to freely rotate about the longitudinal axis relative to the body. Preferably, said shoulder is substantially located in a medial portion of the body of the connector.

Preferably, the inner diameter of the nut is substantially located in correspondence of a proximal end of the nut.

Preferably, the optical fiber connector assembly further comprises an additional nut configured to be disposed about the body.

Preferably, the additional nut has a distal end adapted to engage with a proximal end of the nut.

Preferably, the fiber optic cable comprises yarns that are folded back over the cable jacket of the end portion of the fiber optic cable so that they are disposed between the internal surface of the locking member and the external surface of the cable jacket at the end portion of the fiber optic cable.

Preferably, the fiber optic cable comprises a single optical fiber.

Suitably, the end portion of the optical fiber protrudes from the end portion of the fiber optic cable (the cable jacket being removed from the end portion of the fiber optic cable during assembling).

Preferably, the connector is configured to house the ferrule holder so that a distal end of the ferrule is exposed at a distal end face of the connector.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein:

FIG. 5 schematically shows a first perspective view of the connector of the optical fiber connector assembly of the pre-connectorized fiber optic cable of FIG. 1;

FIG. 6 schematically shows a second perspective view of the connector of FIG. 5;

FIG. 7 schematically shows a first perspective view of the locking member of the optical fiber connector assembly of the pre-connectorized fiber optic cable of FIG. 1;

FIG. 8 schematically shows a second perspective view of the locking member of FIG. 7;

FIG. 13b schematically shows a perspective view of an alternative embodiment of the pre-connectorized fiber optic cable of FIG. 13a;

DETAILED DESCRIPTION OF THE INVENTION

Figure 1:
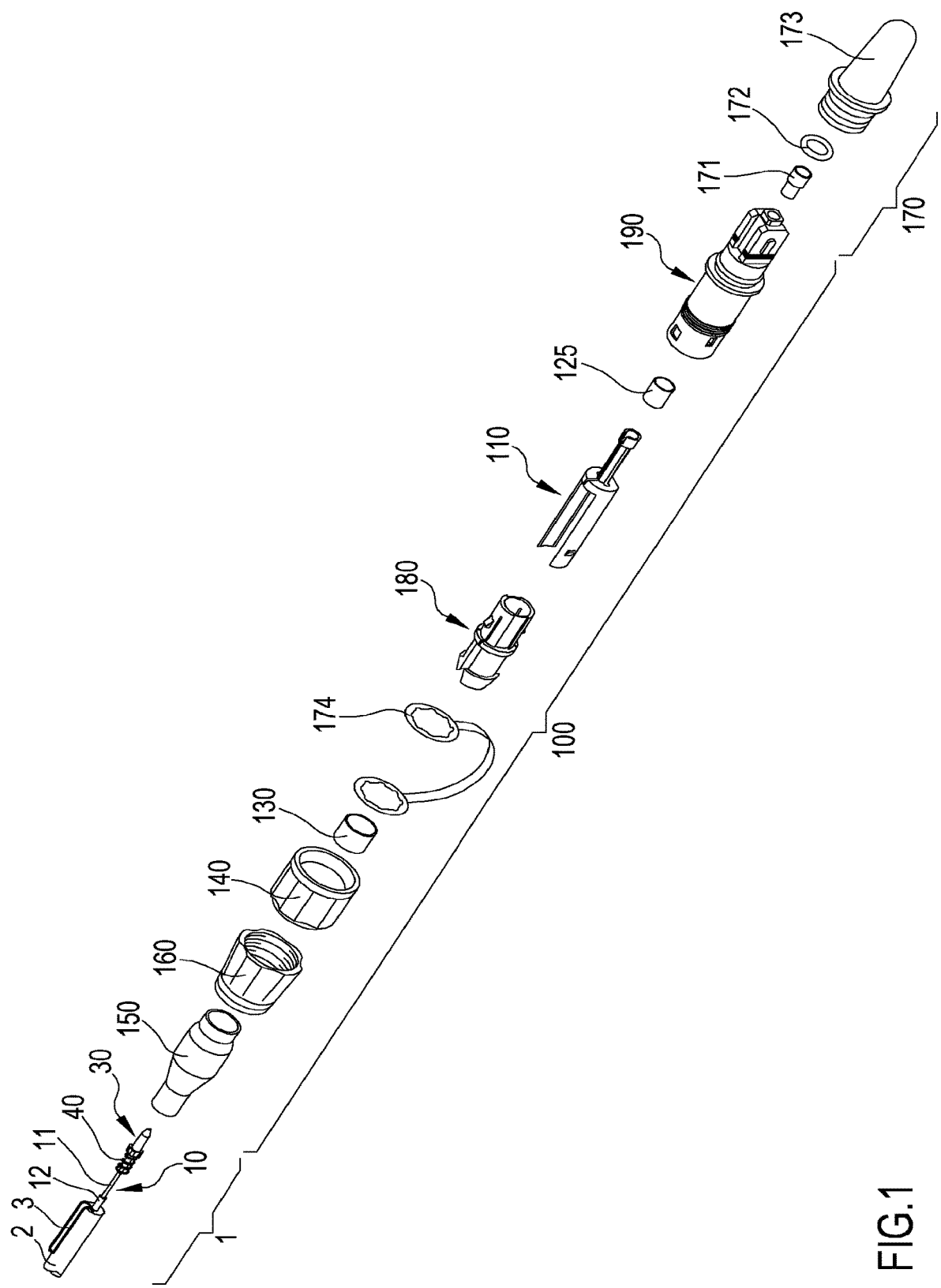
FIG. 1 schematically shows an exploded perspective view of an end portion of a pre-connectorized fiber optic cable according to an embodiment of the invention.

With reference to the figures, it is shown a pre-connectorized fiber optic cable extending lengthwise, along a longitudinal axis. The pre-connectorized fiber optic cable comprises a fiber optic cable 1 and an optical fiber connector assembly 100 according to an embodiment of the invention.

The fiber optic cable 1 comprises an outer protective cable jacket 2 housing a single optical fiber 10 and strength members. The strength members comprise flexible yarns 3 (like, for example, aramid yarns) and/or rod members 4, for example in the form of metallic rods. For the sake of illustration, the yarns 3 are shown only in FIG. 1 while rod members 4 are shown only in FIGS. 4 and 9.

The outer protective cable jacket 2 at the end portion of the fiber optic cable 1 is removed so that the end portion of the optical fiber 10 and the strength members 3, 4 protrude from the end portion of the fiber optic cable 1.

The optical fiber 10 preferably is a single mode fiber comprising a core and a cladding (referred as a whole with the reference number 11). In a preferred embodiment, the core and the cladding 11 are made of a glass material (e.g. silica-based), and a refractive index difference between the core and the cladding 11 is obtained by incorporating suitable additives (dopants) into the glass matrix of core and/or cladding. Generally, the optical fiber 10, outside the cladding, is provided with an external protective coating 12 made of a polymeric material, typically consisting of two layers. Generally, the diameter of the external protective coating 12 is of about 250 μm. Moreover, the outer diameter of the cladding typically is of about 125 μm.

The optical fiber 10 has an end portion terminated with a ferrule 30.

The ferrule 30 generally is a rigid hollow tube used to hold a stripped end of the optical fiber 10 (that is, stripped of its external protective coating 12) and has an internal diameter designed to hold the fiber firmly with a maximum packing fraction. The ferrule 30 provides a means of positioning the optical fiber 10 within the optical fiber connector assembly 100 by performing the function of a bushing.

Figure 4:
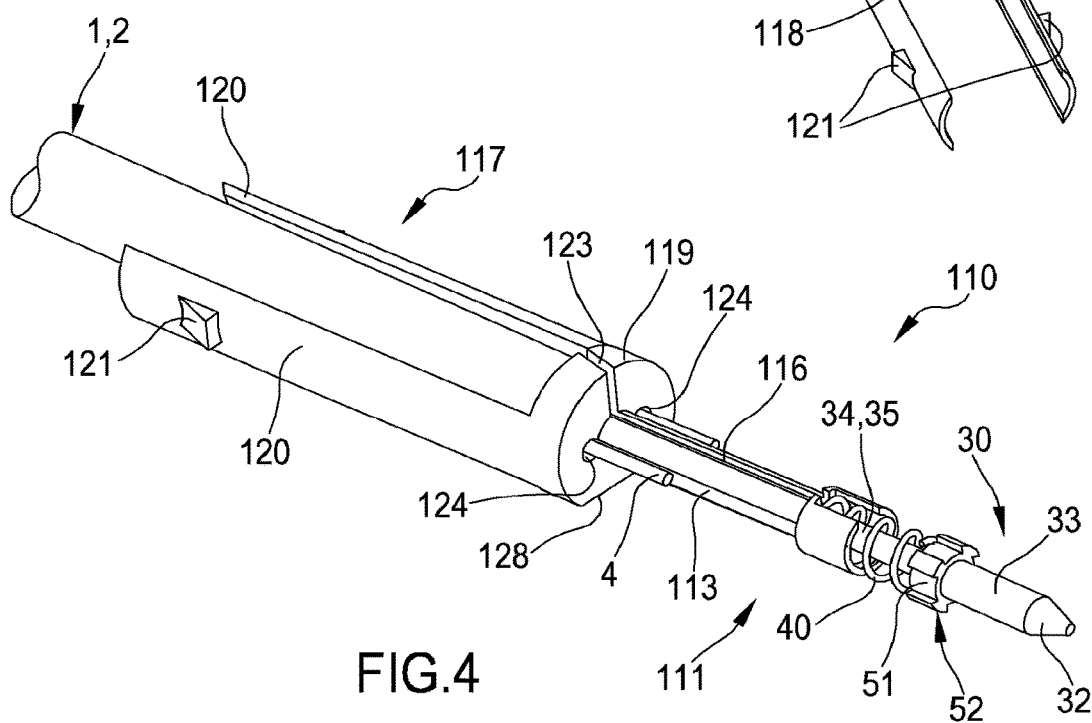
FIG. 4 schematically shows a third perspective view of the ferrule holder of FIGS. 2-3 with an end portion of the fiber optic cable, assembled together.

As shown, for example, in FIG. 4, the ferrule 30 has a distal end 32 and a proximal end 34. The ferrule 30 defines an internal passageway that extends lengthwise between the distal end 32 and the proximal end 34 and within which the stripped end of the optical fiber 10 is firmly housed. The stripped end of the optical fiber 10 passes though the ferrule 30 such that a front face of the optical fiber 10 is substantially flush with the distal end 32 of the ferrule 30 or extends somewhat beyond the distal end 32.

The ferrule 30 comprises a proximal tubular portion 35 (preferably metallic) and a distal tubular portion 33 (preferably made of glass) separated by a flange 52 (preferably metallic). The ferrule 30 is associated with a spring 40. The spring 40 is disposed about the proximal tubular portion 35 of the ferrule 30 and urges towards the flange 52. The flange 52 has an outer diameter greater than the outer diameter of the spring 40 so as to stop the travel of the spring 40 in the lengthwise direction towards the distal end 32 of the ferrule 30, beyond the flange 52.

The flange 52 preferably comprises a plurality of grooves 51. Preferably, the grooves 51 are equal to each other and equally spaced in the angular direction, along the circumference of the flange 52. Preferably, the grooves 51 are four, spaced apart of about 90°.

As shown in the example of FIG. 1, the optical fiber connector assembly 100 comprises a ferrule holder 110, a connector 190 and a locking member 180.

The ferrule holder 110 is preferably monolithic (i.e. made of one piece).

The ferrule holder 110 is preferably formed of plastic.

As shown in the example of FIGS. from 2 to 4, the ferrule holder 110 comprises a sleeve portion 111 (forming a distal portion) and a proximal portion 117.

The sleeve portion 111 extends lengthwise between opposed distal and proximal ends 112, 114 and defines an internal passageway that extends lengthwise between the distal end 112 and the proximal end 114 for housing the end portion of the optical fiber 10 terminated with the ferrule 30.

The sleeve portion 111 provides a support for the assembly ferrule 30-spring 40 so that at least the distal portion 33 of the ferrule beyond the flange 52 projects beyond the sleeve portion 111 (as schematically shown in FIG. 4). Proximate the distal end 112, the sleeve 110 defines an internal shoulder 115. The spring 40 is disposed within the sleeve portion 111 between the internal shoulder 115 and the flange 52.

In a preferred embodiment, the internal passageway of the sleeve portion 111 has an inner diameter/size smaller than the outer diameter/size of the ferrule 30. This advantageously enables to limit the cross-section size of the sleeve portion 111.

In order to allow the end portion of the optical fiber 10 (which is pre-terminated with the assembly ferrule 30-spring 40) to be inserted within the sleeve portion 111, the latter preferably comprises a slot 116 extending lengthwise between the distal and proximal ends 112, 114, and having a size such as to enable insertion of the end portion of the optical fiber 10. Proximate the internal shoulder 115, the slot 116 has a greater size in the crosswise direction, so as to enable insertion of the spring 40 and ferrule 30.

Figure 14:
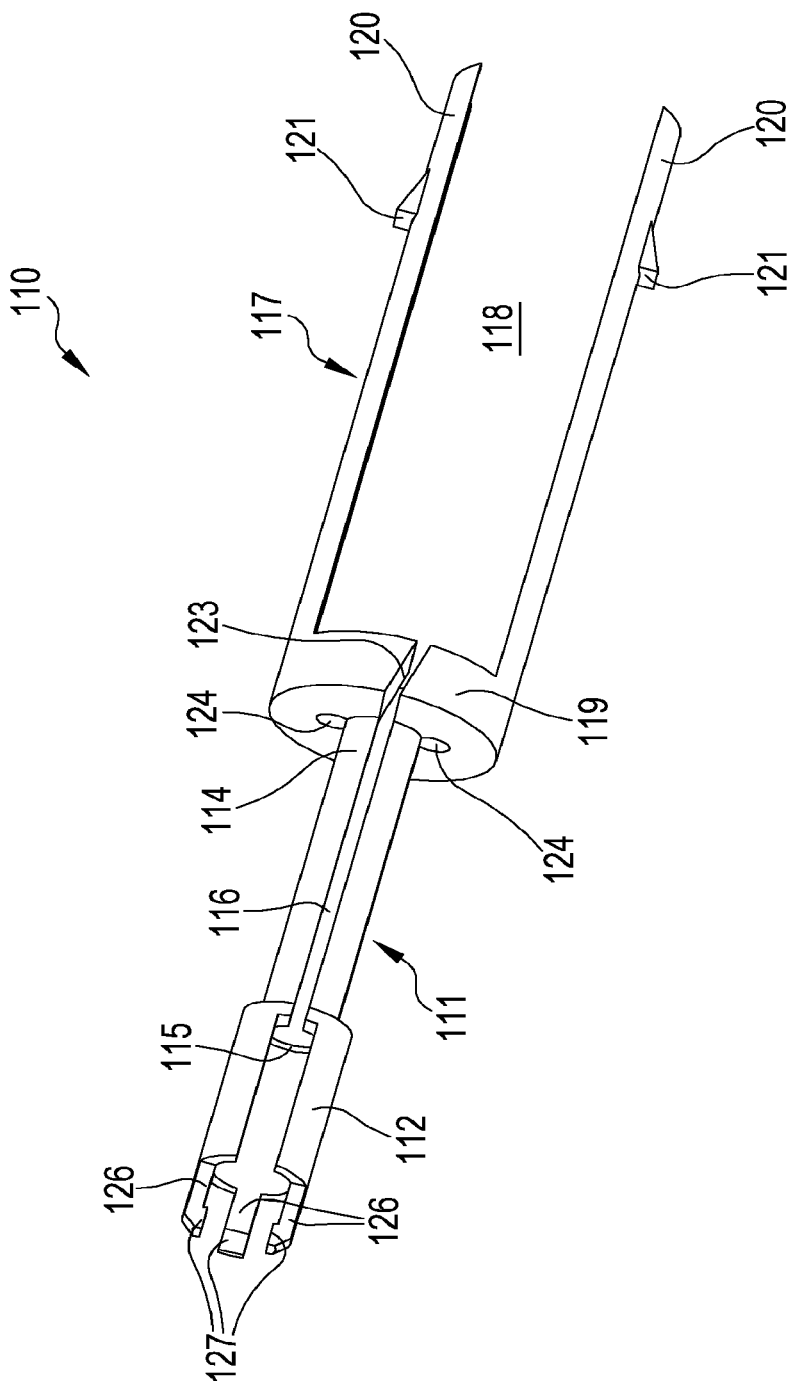
FIG. 14 schematically shows a perspective view of a ferrule holder of the optical fiber connector assembly of the pre-connectorized fiber optic cable of FIG. 1, according to a further preferred embodiment of the invention.

In a preferred embodiment shown in FIG. 14, the sleeve portion 111 preferably comprises at least one finger 126 projecting from the distal end 112, providing a support for the assembly ferrule 30-spring 40. The presence of more than one finger 126 (in FIG. 14, three fingers 126 are exemplarily shown) enables to improve the firmness of the supporting function performed by the sleeve portion 111. Preferably, each finger 126 has a distal end with a protrusion 127. Each protrusion 127 is preferably configured so as to engage one of the grooves 51 of the flange 52. Considering that the front face of the end portion of the optical fiber 10 can be angled, this enables to orientate the angled front face of the optical fiber 10 according to a number of positions corresponding to the number of the grooves 51. As stated above, in the embodiment shown, the grooves 51 are four and equally spaced in the angular direction so that the front face of the optical fiber 10 can be oriented according to four positions angularly spaced apart of 90°. This is advantageous because it increases the possibility of matching the angle of the front face of the optical fiber 10 with the angle of a mating optical fiber. This advantageously increases the flexibility of use of the optical fiber connector assembly 100.

The sleeve portion 111 comprises on the external lateral surface a plurality of grooves 113 that extends lengthwise from the proximal end 114 toward the distal end 112 for housing the rod members 4. In the example, the fiber optic cable 1 comprises two rod members 4 and the sleeve portion 111 comprises two corresponding grooves 113. The grooves 113 provide a support for the rod members 4. In the embodiment shown, the grooves 113 are disposed at two diametrically opposite positions with respect to the slot 116.

The proximal portion 117 of the ferrule holder 110 comprises a seat 118 for an end portion of the fiber optic cable 1. The seat 118 has inner size substantially equal to the outer diameter of the protective cable jacket 2 of the fiber optic cable 1.

The seat 118 is configured to receive and mate with the end portion of the fiber optic cable 1 (as schematically shown in FIG. 4).

In the embodiment shown (see, in particular, FIGS. 2 and 3), the sleeve portion 111 and the proximal portion 117 of the ferrule holder 110 are separated by a generally medial portion 119 of the ferrule holder 110. The medial portion 119 is generally disc shaped and disposed substantially crosswise, perpendicular to the longitudinal axis of the ferrule holder 110.

The medial portion 119 provides an abutment surface for the front face of the end portion of the fiber optic cable 1. The seat 118 is preferably defined by a fork configuration of the proximal portion 117 of the ferrule holder 110, which comprises two opposed arms 120 extending lengthwise and projecting backward from the medial portion 119. Except for the walls defined by two opposed arms 120, the rest of the seat 118 is open. The two opposed arms 120 are spaced apart by a distance substantially equal to the outer diameter of the protective cable jacket 2 of the fiber optic cable 1.

The two opposed arms 120 comprise each a snap coupling member 121.

Figure 2:
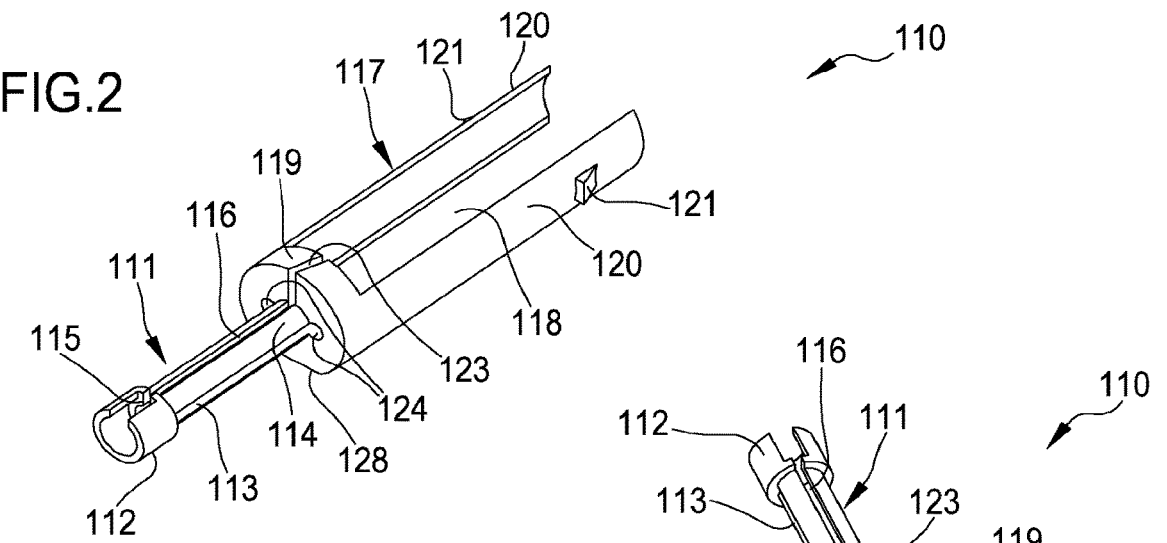
FIG. 2 schematically shows a first perspective view of a ferrule holder of the optical fiber connector assembly of the pre-connectorized fiber optic cable of FIG. 1.
Figure 3:
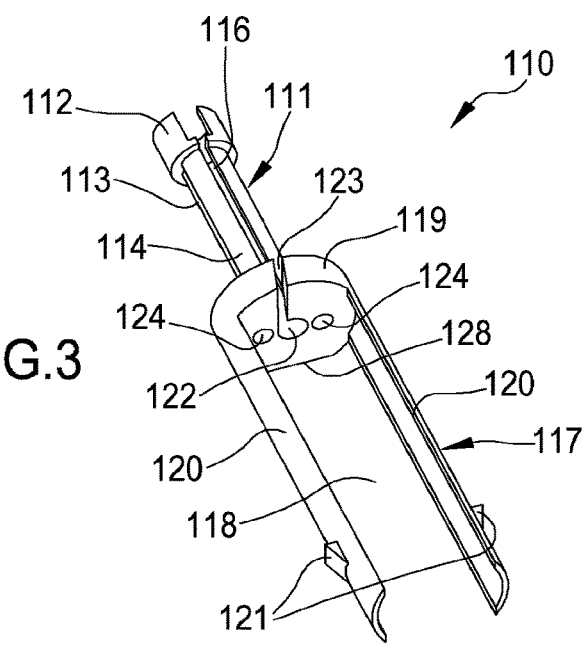
FIG. 3 schematically shows a second perspective view of the ferrule holder of FIG. 2.

The medial portion 119 of the ferrule holder 110 comprises a substantially central hole 122. The central hole 122 is in communication with the internal passageway of the sleeve portion 111. The central hole 122 provides a passage for the end portion of the optical fiber 10. The medial portion 119 has a slot 123 in communication with the central hole 122 and with the slot 116 of the sleeve portion 111. The slot 123 of the medial portion 119 has a size such as to enable insertion of the end portion of the optical fiber 10 into the central hole 122. Preferably, the slot 123 is on an angle (as shown in FIGS. 2-4) so as to prevent the optical fiber 10 coming out easily once inserted.

The medial portion 119 of the ferrule holder 110 further comprises a plurality of external holes 124. The external holes 124 are in communication with the grooves 113 of the sleeve portion 111. The external holes 124 are configured to receive the rod members 4 of the fiber optic cable 1. In the example, the external holes 124 are two. In the embodiment shown, the two external holes 124 are disposed at two diametrically opposite positions with respect to the central hole 122, along a transversal axis perpendicular to the longitudinal axis of the ferrule holder 110.

The optical fiber connector assembly 100 also comprises a first crimping element 125 (see FIG. 9) configured to be disposed about the proximal end 114 of the sleeve portion 111 and to grip the rod members 4. In order to provide additional grip, the grooves 113 may be ribbed.

The first crimping element 125 preferably is a hollow cylindrical ring. The crimping element 125 can be, for example, metallic.

As shown in particular in FIGS. 5 and 6, the connector 190 comprises a body 191 which defines an internal passageway that extends lengthwise between its ends. The internal passageway has open crosswise end faces and is configured so as to be able to directly house the ferrule holder 110 so that the distal end 32 of the ferrule 30 is exposed at the distal end face of the connector 190.

Preferably, the body 191 is monolithic.

The body 191 is preferably formed of plastic.

The body 191 comprises a distal portion 193 and a proximal portion 195 extending lengthwise, preferably cylindrical.

The distal portion 193 has an outer diameter smaller than the outer diameter of the proximal portion 195.

The distal portion 193 preferably has a continuous lateral surface (without openings).

The distal portion 193 ends in the shape of a standard ferrule plug housing and the latter is preferably configured to mate with a corresponding fiber optic receptacle (as, for example, a standard SC adaptor).

In a preferred embodiment (shown in FIGS. 1-4, 9), the medial portion 119 of the ferrule holder 110 has a flat portion 128 opposite the slot 123. Moreover, the body 191 preferably comprises, in its internal surface, a flat protrusion (not shown), adapted to mate with the flat portion 128 of the ferrule holder 110 so as to prevent relative rotation between the ferrule holder 110 and the body 191 about the longitudinal axis of the body 191, and to enable positioning of the ferrule holder 110 within the body 191 according to a predefined direction.

The distal portion 193 preferably comprises, in its outer surface, a circumferential groove 199 wherein a O-ring 200 is mounted. The O-ring 200 is preferably formed of rubber. The O-ring 200 is adapted to mate with a corresponding circumferential groove (not shown) of a fiber optic receptacle so as to perform a sealing function.

The proximal portion 195 of the body 191 has on its lateral surface first snap coupling members 197. The first snap coupling members 197 are configured and disposed in the proximal portion 195 so as to engage with the snap coupling members 121 on the two opposite arms 120 of the ferrule holder 110 and to snap couple the proximal portion 195 of the body 191 with the proximal portion 117 of the ferrule holder 110.

This snap coupling advantageously enables to mechanically couple the body 191 and the ferrule holder 110 such as to prevent both a relative rotation and a relative movement between them about/along the longitudinal axis of the optical fiber connector assembly 100. In the embodiment shown, the first snap coupling members 197 are in the form of a pair of diametrically opposite openings while the snap coupling members 121 are in the form of snap hooks.

The proximal portion 195 of the connector 190 further comprises on its lateral surface second snap coupling members 198. The second snap coupling members 198 are configured and disposed in the proximal portion 195 so as to engage with corresponding snap coupling members 181 (see FIGS. 5-8) on the locking member 180 and to snap couple the proximal portion 195 of the body 191 with the locking member 180.

The snap coupling members 181, 198 advantageously enable to mechanically couple the locking member 180 and the body 191 such as to prevent both a relative rotation and a relative movement between them about/along the longitudinal axis of the optical fiber connector assembly 100.

In the embodiment shown, the second snap coupling members 198 are in the form of a pair of diametrically opposite openings while the snap coupling members 181 on the locking member 180 are in the form of a pair of diametrically opposite snap hooks. In the embodiment shown, the second snap coupling members 198 are 90° displaced with respect to the first snap coupling members 197.

The distal portion 193 and the proximal portion 195 of the body 191 are preferably separated by a shoulder 196. The shoulder 196 has an outer diameter greater than the outer diameter of the distal portion 193 and the outer diameter of the proximal portion 195.

As shown in particular in FIGS. 7 and 8, the locking member 180 is disposed about a longitudinal axis and extends lengthwise between a distal portion 183 and a proximal portion 185.

Preferably, the locking member 180 is monolithic (e.g. made in one piece).

The locking member 180 is preferably formed of plastic.

The locking member 180 defines an internal passageway that extends lengthwise between its ends. The internal passageway has open crosswise end faces and is configured to house the end portion of the fiber optic cable 1.

The distal portion 183 and the proximal portion 185 are generally cylindrical.

The proximal portion 185 is preferably tapered inwards.

The distal portion 183 has an inner diameter substantially equal to the inner diameter of the proximal portion 185 and substantially equal to the outer diameter of the protective cable jacket 2 of the fiber optic cable 1.

The proximal portion 185 has on its lateral surface at least one aperture. In particular, in the embodiment shown, the proximal portion 185 has a pair of diametrically opposite lateral apertures 187 extending lengthwise throughout the proximal portion 185.

The distal portion 183 of the locking member 180 has said snap coupling members 181 adapted to engage the second snap coupling members 198 on the proximal portion 195 of the body 191.

The parts of the distal portion 183 of the locking member 180 wherein the snap coupling members 181 are present are preferably in the form of a tongue, in order to facilitate the snap coupling between the locking member 180 and the body 191.

The distal portion 183 of the locking member 180 comprises a pair of diametrically opposite recesses 188 extending lengthwise throughout the distal portion 183, configured to mate with and accommodate the two opposite arms 120 of the proximal portion 117 of the ferrule holder 110. This advantageously enables to mechanically couple the locking member 180 and the ferrule holder 110 such as to prevent a relative rotation between them about the longitudinal axis of the optical fiber connector assembly 100, while enabling relative axial movement.

The distal portion 183 and the proximal portion 185 are preferably separated by a shoulder 186. The shoulder 186 has an outer diameter greater than the outer diameter of the distal portion 183 and the proximal portion 185.

The optical fiber connector assembly 100 further comprises a second crimping element 130 (see FIG. 10) to fix the proximal portion 185 of the locking member 180 to the end portion of the fiber optic cable 1. The second crimping element 130 is adapted to be disposed about the proximal portion 185 at the lateral apertures 187 and to grip the yarns 3 (previously folded back over the cable jacket 2, as explained in more detail below) together with the cable jacket 2. The presence of the lateral apertures 187 advantageously facilitate the crimping function.

The second crimping element 130 preferably is a hollow cylindrical ring. The crimping element 130 can be, for example, metallic.

The optical fiber connector assembly 100 further comprises a nut 140 (see, in particular, FIG. 11) which is configured to be disposed about the body 191 and to fix the optical fiber connector assembly 100 to a corresponding fiber optic receptacle (not shown). The nut 140 may have an internal/external thread (respectively shown in FIGS. 13a and 13b) to threadably engage the fiber optic receptacle by mating with a corresponding external/internal thread of a receiving portion of the fiber optic receptacle.

The nut 140 has a proximal portion with an inner diameter lower than the outer diameter of the shoulder 196 of the body 191 and a distal portion with an inner diameter greater than the outer diameter of the shoulder 196 of the body 191. In this way, the nut 140 is disposed in part about the proximal portion 195 of the body 191 and in part (preferably, mainly) about the distal portion 193 of the body 191. The travel of the nut 140 in the lengthwise direction towards the distal portion 193 of the connector 190 is limited, while allowing the nut 140 to freely rotate about the longitudinal axis relative to the body 191.

The nut 140 is preferably formed of plastic.

The optical fiber connector assembly 100 further comprises a shrinking sheath 150 (see FIGS. 11-13) which is configured to heat shrink about the end portion of the fiber optic cable 1, the locking member 180, the second crimping element 130 and the proximal portion 195 of the body 191. The shrinking sheath 150 provides additional retention to the cable jacket 2 and seals the back of the fiber connector assembly 100 around the cable jacket 2. Since the shrinking sheath 150 fits tightly about the cable jacket 2, it seals the optical fiber connector assembly 100 from the environment and protect against environmental degradation. The shrinking sheath 150 could be formed, for example, of Polyolefin (POX), Elastomer (PES), Fluoropolymer (FPM), Polyvinylidenefluoride (PVDF) and Polytetrafluorethylene (PTFE).

The optical fiber connector assembly 100 could also comprise an additional nut 160 (see FIGS. 12-13), for example formed of rubber, adapted to provide further protection to the back of the optical fiber connector assembly 100 and an additional grip for a user. A distal end of the additional nut 160 is preferably configured to mate with a proximal end of the nut 140, for example by clipping.

In a preferred embodiment (shown in FIG. 1 only), the pre-connectorized fiber optic cable could also comprise a dust cap 170 to protect the optical fiber connector assembly 100 when it is not coupled to a corresponding receptacle.

In the embodiment shown, the dust cap 170 comprises a first cap 171 for the front face of the ferrule 30, a second cap 173 having a proximal portion with a thread adapted to mate with the thread of the nut 140, and a sealing O-ring 172 adapted to mate with corresponding engagements in the first and second caps 171, 173 so as to perform a sealing function. The dust cap 170 preferably also comprises a lanyard 174 having at rings at two opposed ends of the lanyard 174. The rings are adapted to engage, on one side, the optical fiber connector assembly 100 and, on the other side, the dust cap 170 such that when the dust cap is removed from the optical fiber connector assembly 100, the dust cap 170 remains coupled to it.

During installation, an end portion of the fiber optic cable 1 is prepared for termination. The cable jacket 2 at the end portion is removed. The yarns 3 are folded back over the cable jacket 2. The optical fiber 10 is terminated with the assembly spring 40-ferrule 30.

The additional nut 160, the shrinking sheath 150, the nut 140, the second crimping element 130, the locking member 180 and the O-ring 200 are slid backwardly along the end portion of the fiber optic cable 1.

The end portion of the optical fiber 10 is inserted within the internal passageway of the sleeve portion 111 of the ferrule holder 110, through the slots 116, 123 and within the central hole 122 of the medial portion 119 of the ferrule holder 110. The assembly spring 40-ferrule 30 is accommodated within the sleeve portion 111 so that the spring 40 is located between the internal shoulder 115 of the sleeve 110 and the flange 52 so that the ferrule 30 is biased forwardly. The end portion of the fiber optic cable 1 is accommodated within the seat 118 with the end front face in abutment with the medial portion 119 of the ferrule holder 110. The rod members 4 are housed in the respective grooves 113 in the sleeve portion 111, passing through the external holes 124 of the medial portion 119 of the ferrule holder 110 (see FIG. 4).

Figure 9:
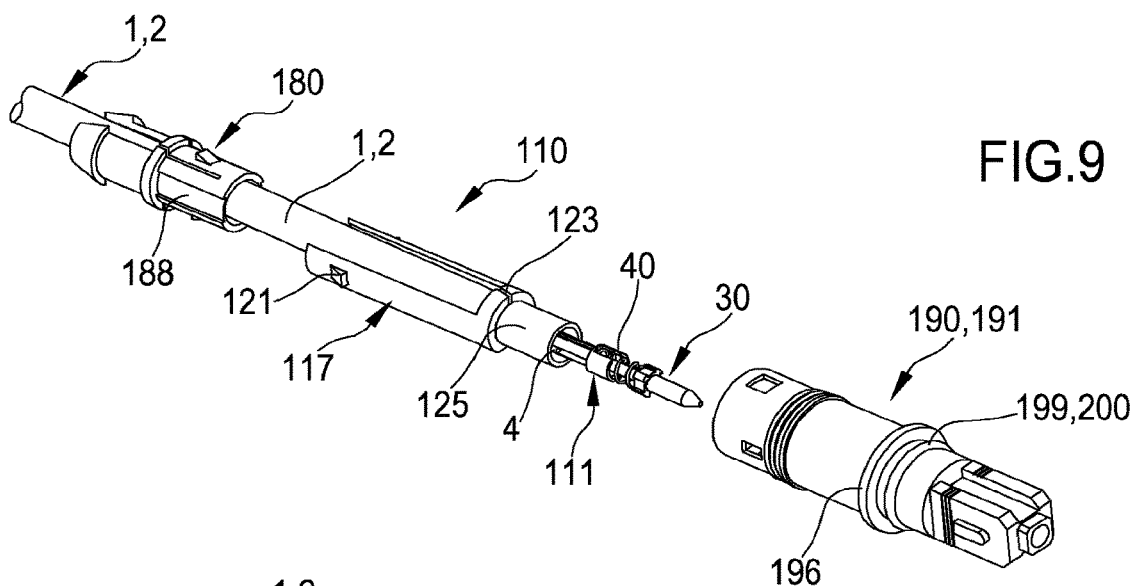
FIG. 9 schematically shows a perspective view of an end portion of a fiber optic cable assembled with a ferrule holder and a first crimping element, together with a connector and a locking member of the optical fiber connector assembly of the pre-connectorized fiber optic cable of FIG. 1.

The first crimping element 125 is disposed about the proximal end 114 of the sleeve portion 111 and it is crimped to grip the rod members 4 (see FIG. 9).

The body 191 is then slid backwardly about the ferrule holder 110 and about the end portion of the fiber optic cable 1 until the ferrule holder 110 is accommodated within the body 191, the front face of the distal end 32 of the ferrule 30 is exposed through the open front face of the body 191, and the first snap coupling members 197 on the proximal portion 195 of the body 191 engage the snap coupling members 121 on the two opposed arms 120 of the ferrule holder 110.

Figure 10:
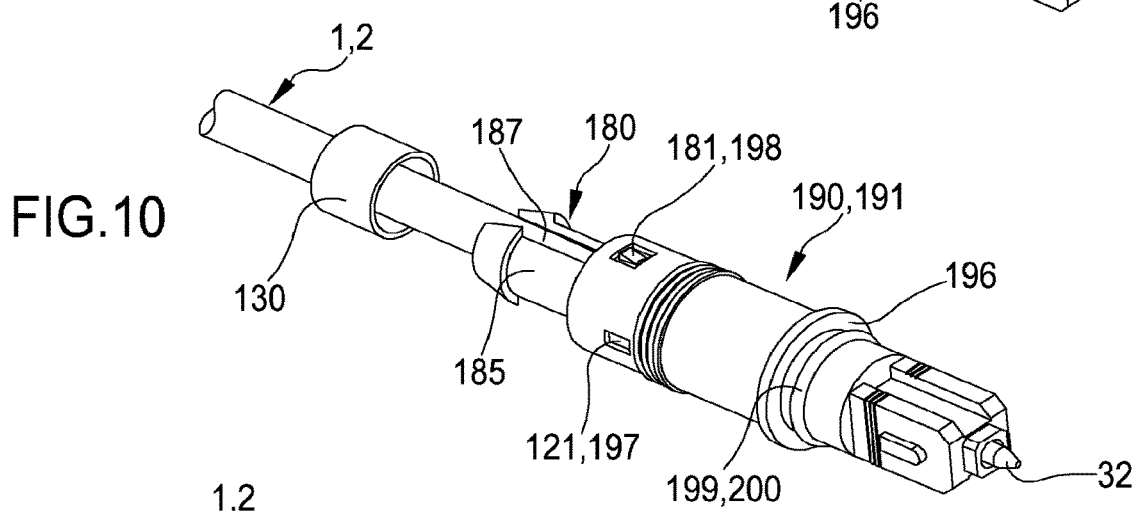
FIG. 10 schematically shows a perspective view of an end portion of a fiber optic cable, a connector and a locking member, assembled together, with a second crimping element of the optical fiber connector assembly of the pre-connectorized fiber optic cable of FIG. 1.

The O-ring 200 is slid forwardly along the body 191 until it engages the corresponding circumferential groove 199 on the distal portion 193 of the body 191 (see FIGS. 9-10).

The locking member 180 is slid forwardly along the end portion of the fiber optic cable 1 until the recesses 188 accommodate and mate with the two opposite arms 120 of the ferrule holder 110 and the snap coupling members 181 of the locking member 180 engage the second snap coupling members 198 on the proximal portion 195 of the body 191 (see FIGS. 9-10).

The second crimping element 130 is then slid forwardly along the locking member 180 until it is disposed about the lateral apertures 187. Then it is crimped to grip the yarns 3 (previously folded back over the cable jacket 2) and the cable jacket 2 (FIGS. 10-11).

Figure 11:
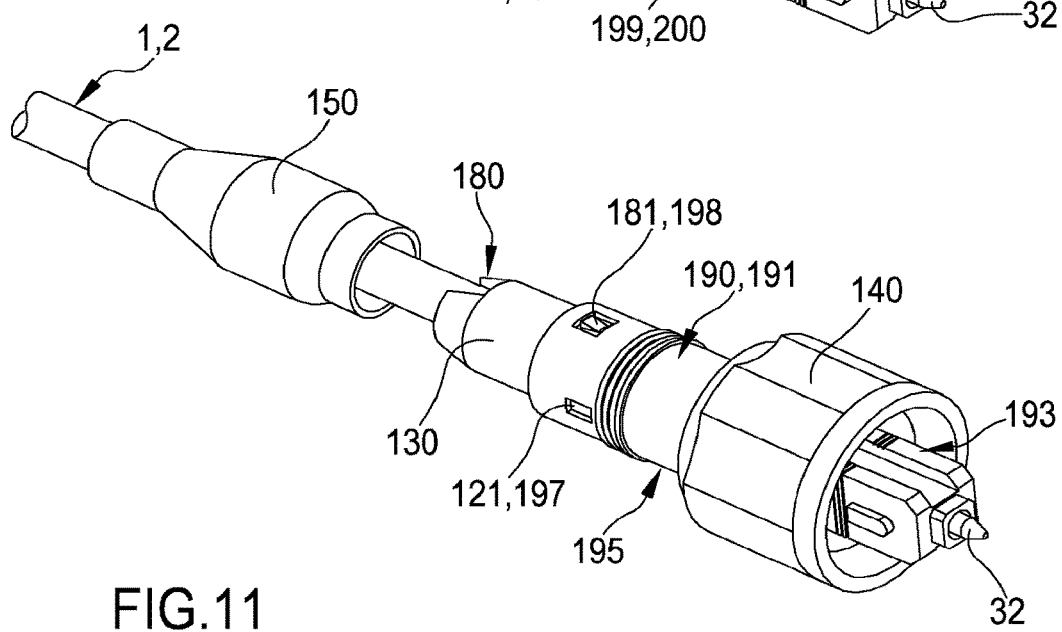
FIG. 11 schematically shows a perspective view of an end portion of a fiber optic cable, a connector, a locking member, a second crimping element and a nut assembled together, with a shrinking sheath of the optical fiber connector assembly of the pre-connectorized fiber optic cable of FIG. 1.

The nut 140 is slid forwardly along the body 191 until its travel is stopped by the shoulder 196 (FIG. 11).

Figure 12:
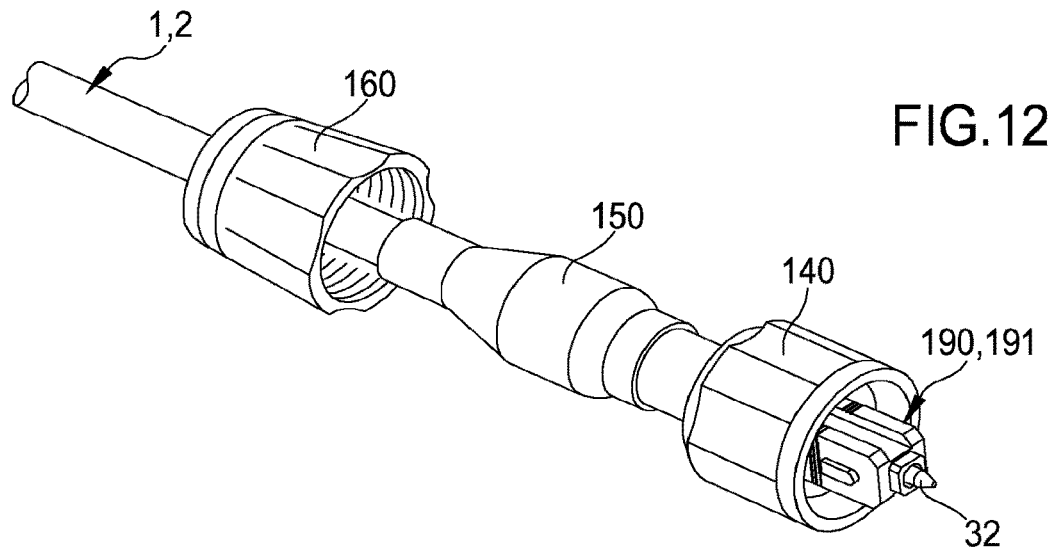
FIG. 12 schematically shows a perspective view of an end portion of a fiber optic cable, a connector, a locking member, a second crimping element, a nut and a shrinking sheath assembled together, with an additional nut of the optical fiber connector assembly of the pre-connectorized fiber optic cable of FIG. 1.

The shrinking sheath 150 is heat shrunk about the end portion of the fiber optic cable 1, the locking member 180, the second crimping element 130 and the proximal portion 195 of the body 191 (FIGS. 11-12).

In order to complete the assembly, the additional nut 160 is slid forwardly along the body 191 until it clips the back portion of the nut 140 (FIGS. 12-13).

Figure 13A:
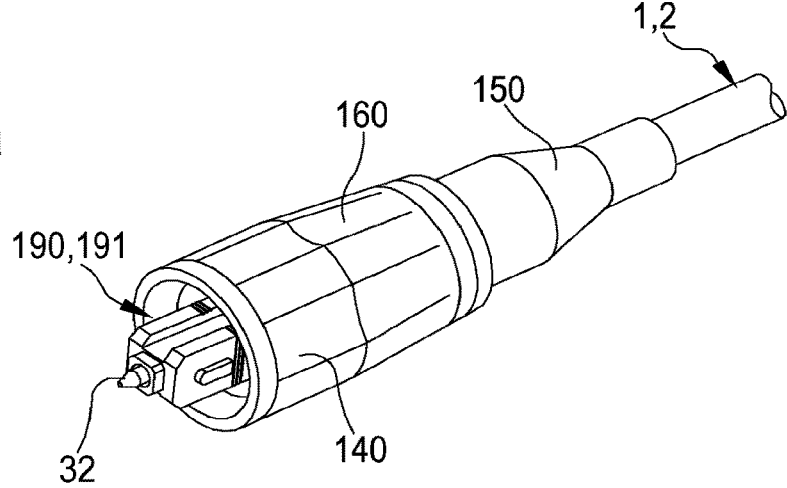
FIG. 13a schematically shows a perspective view of the pre-connectorized fiber optic cable of FIG. 1 wherein the optical fiber connector assembly is assembled and mounted upon the end portion of the fiber optic cable.
Figure 13B:
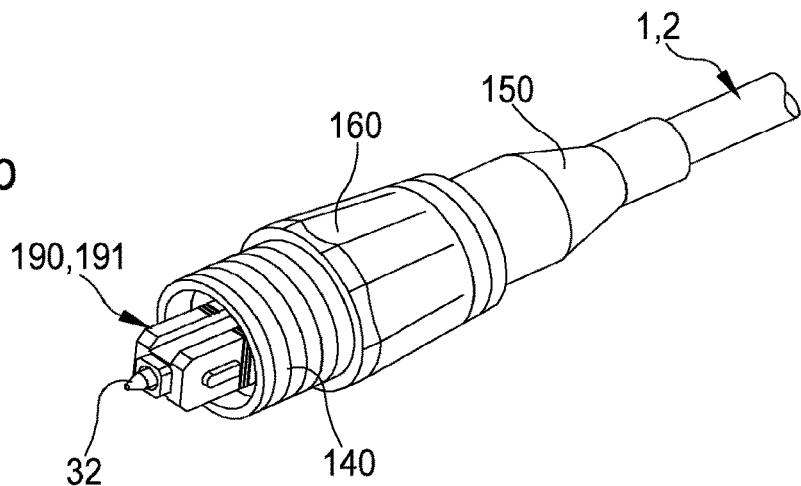

The assembly is thus completed, as shown in FIG. 13a and in the variant of FIG. 13b.

The pre-connectorized fiber optic cable, with the optical fiber connector assembly 100 thus assembled, is ready to be coupled to a corresponding fiber optic receptacle (not shown). The fiber optic receptacle can comprise, for example, a receptacle body having an internal passageway extending through opposite ends. The internal passageway may accommodate, proximate a first end of the opposite ends, a hollow adapter sleeve (e.g. a standard SC adaptor) adapted to directly receive the distal portion 193 of the body 191 (e.g. shaped as a standard SC connector). At said first end, the fiber optic receptacle preferably also comprises an externally/internally threaded portion for engaging the internal/external thread of the nut 140. Proximate the opposite second end, the internal passageway may accommodate a further hollow adapter sleeve adapted to receive a connector assembly coupled to a mating optical fiber.

It will be clear from the above description that the optical fiber connector assembly 100 of the present description can be coupled to the end portion of the fiber optic cable 1 by means of an improved mechanical coupling. This is achieved thanks to the fact that each element among the ferrule holder 110, the body 191 and the locking member 180 is directly (without intermediate elements) mechanically coupled to both the other two elements. In particular, the body 191 is snap coupled both to the ferrule holder 110 and the locking member 180 so as to prevent any relative rotation and movement between them about/along the longitudinal axis of the connector assembly 100. In addition, the ferrule holder 110 and the locking member 180 are coupled with a mechanical coupling that prevents any relative rotation between them about said longitudinal axis. This advantageously allows to increase the mechanical strength of the optical fiber connector assembly, and the compactness thereof. In addition, the ferrule holder, configured so as to hold the end portion of the optical fiber 10, the ferrule 30 and the rod members 4, and to mate with the end portion of the fiber optic cable 1, advantageously enables to avoid cable bending in the proximity of the ferrule 30 and to increase firmness of the coupling.

The invention claimed is:

1. An optical fiber connector assembly for a fiber optic cable comprising an optical fiber, having an end portion terminated with a ferrule, and rod members, the optical fiber connector assembly extending lengthwise along a longitudinal axis and comprising:
   a ferrule holder configured to hold the end portion of the optical fiber, the ferrule and the rod members;
   a connector having an internal passageway for housing the ferrule holder; and
   a locking member extending lengthwise and having an internal passageway for the end portion of the fiber optic cable;
   wherein the connector is configured to be mechanically coupled to the ferrule holder to prevent relative rotation about the longitudinal axis and relative axial movement along the longitudinal axis; and
   wherein the locking member is configured to be mechanically coupled both to the ferrule holder and to the connector.

2. The optical fiber connector assembly according to claim 1, wherein the mechanical coupling between the locking member and the connector is also configured to prevent relative rotation about the longitudinal axis and relative axial movement along the longitudinal axis.

3. The optical fiber connector assembly according to claim 1, wherein the mechanical coupling between the connector and the ferrule holder is a snap coupling.

4. The optical fiber connector assembly according to claim 2, wherein the mechanical coupling between the locking member and the connector is a snap coupling.

5. The optical fiber connector assembly according to claim 1, wherein the ferrule holder comprises:
   a proximal portion comprising a seat for the end portion of the fiber optic cable; and
   a distal portion comprising a sleeve portion configured to hold the end portion of the optical fiber, the ferrule and the rod members.

6. The optical fiber connector assembly according to claim 5, wherein the proximal portion of the ferrule holder comprises two opposite arms forming the seat.

7. The optical fiber connector assembly according to claim 6 wherein the locking member comprises a distal portion configured to mate with the opposite arms so as to provide the mechanical coupling to the proximal portion of the ferrule holder.

8. The optical fiber connector assembly according to claim 7, wherein the distal portion of the locking member comprises two recesses extending lengthwise, configured to mate with the opposite arms of the ferrule holder.

9. The optical fiber connector assembly according to claim 6, wherein the two opposite arms of the proximal portion of the ferrule holder comprise respective coupling members configured to engage corresponding coupling members in a proximal portion of a body of the connector, so as to provide the mechanical coupling between the proximal portion of the body of the connector and the proximal portion of the ferrule holder.

10. The optical fiber connector assembly according to claim 6, wherein the ferrule holder comprises a medial portion between the sleeve portion and the proximal portion.

11. The optical fiber connector assembly according to claim 10, wherein the two opposite arms forming said seat extend lengthwise and project backward from the medial portion of the ferrule holder.

12. The optical fiber connector assembly according to claim 10, wherein the medial portion of the ferrule holder provides an abutment surface for the front face of the end portion of the fiber optic cable.

13. The optical fiber connector assembly according to claim 10, wherein the medial portion of the ferrule holder comprises a hole in communication with an internal passageway of the sleeve portion for receiving the end portion of the optical fiber terminated with the ferrule.

14. The optical fiber connector assembly according to claim 5, wherein the sleeve portion of the ferrule holder comprises grooves on the lateral external surface thereof, the grooves extending lengthwise between proximal and distal ends of the sleeve portion and being configured to house the rod members.

15. The optical fiber connector assembly according to claim 14, wherein the medial portion comprises holes in communication with the grooves for receiving the rod members.

16. The optical fiber connector assembly according to claim 1, comprising a first crimping element configured to be disposed about the ferrule holder to grip the rod members.

17. The optical fiber connector assembly according to claim 1, comprising a second crimping element adapted to crimp a proximal portion of the locking member about the end portion of the fiber optic cable.

18. The optical fiber connector assembly according to claim 17, wherein a proximal portion of the locking member has on a lateral surface thereof at least one aperture and the second crimping element is adapted to crimp the locking member about the end portion of the fiber optic cable at the at least one aperture.

* * * * *